Nov. 25, 1924.  
H. A. BRENAMAN  
MACHINE TOOL  
Filed Dec. 15, 1922  
1,516,951  
3 Sheets-Sheet 1
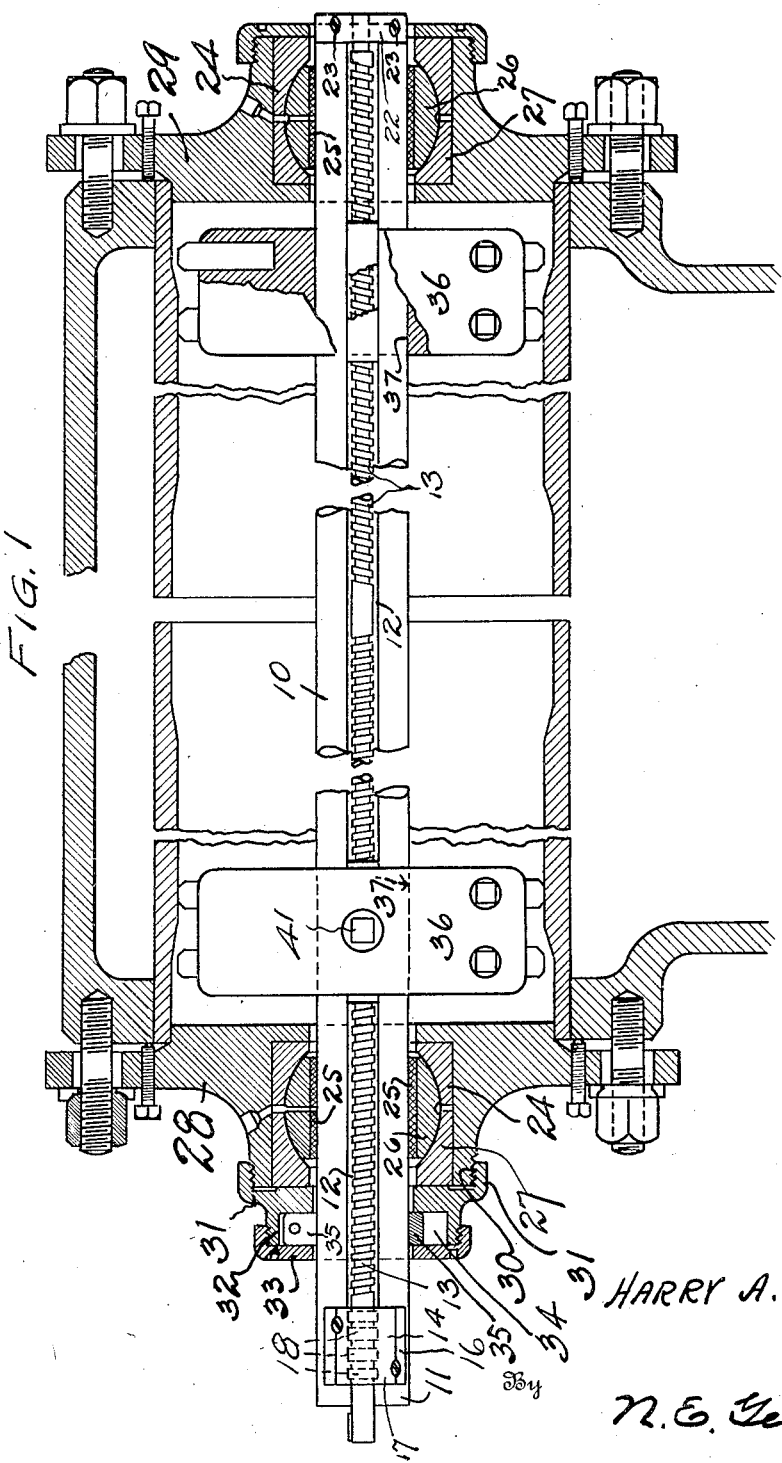
Inventor  
HARRY A. BRENAMAN  
By  
N. E. Gee  
Attorney

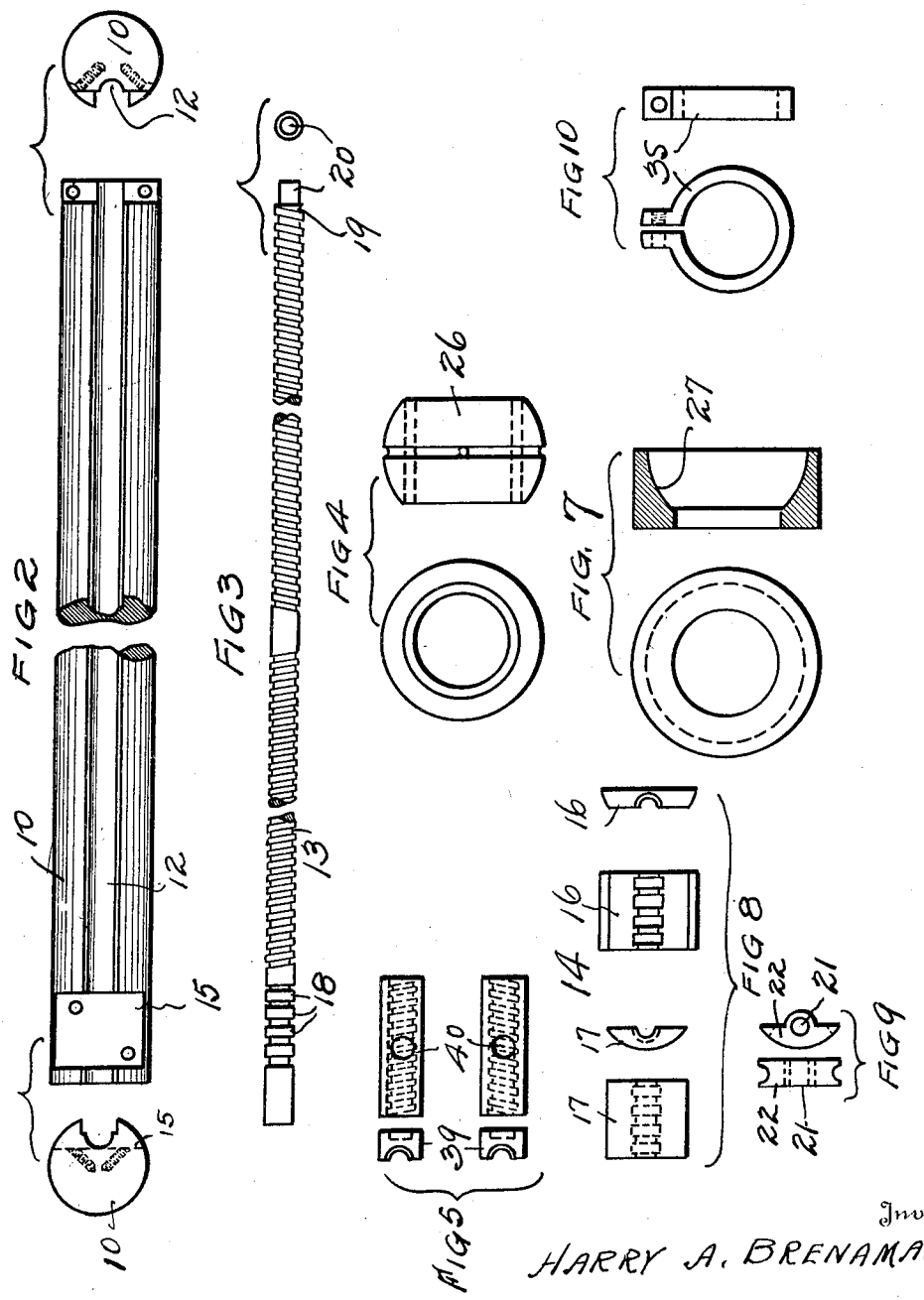

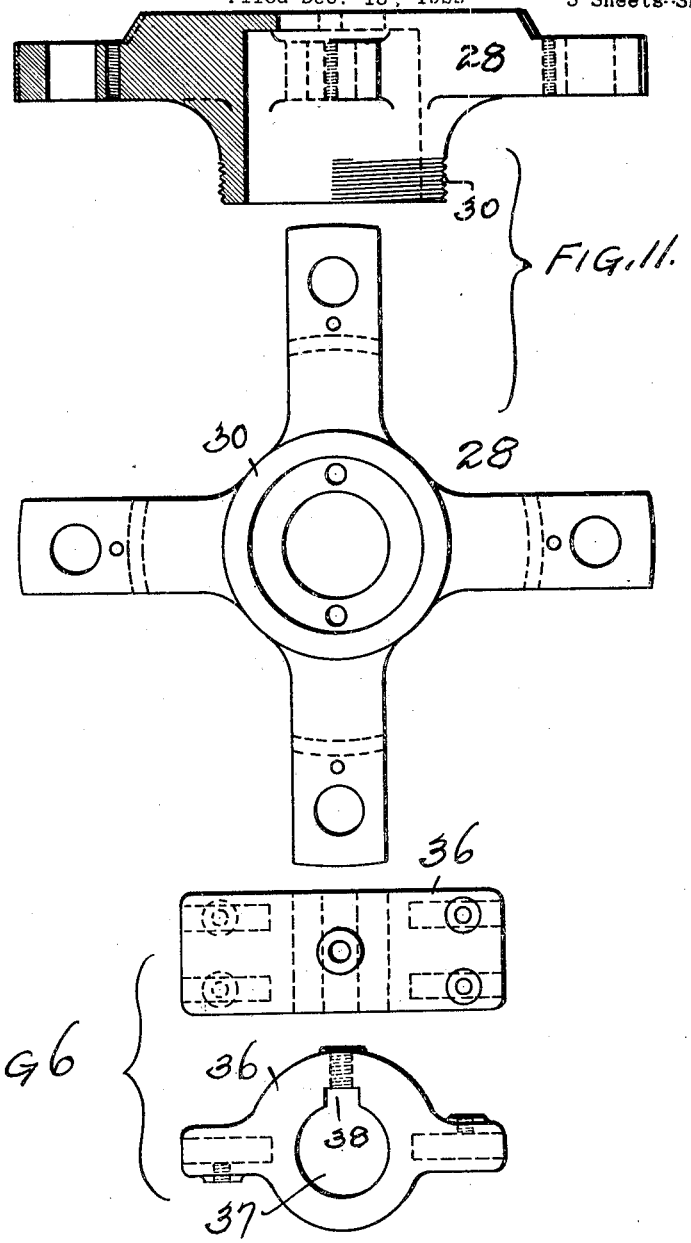

Patented Nov. 25, 1924.

1,516,951

UNITED STATES PATENT OFFICE.

HARRY A. BRENAMAN, OF ALTOONA, PENNSYLVANIA.

MACHINE TOOL.

Application filed December 15, 1922. Serial No. 607,156.

*To all whom it may concern:*

Be it known that HARRY A. BRENAMAN, a citizen of the United States, residing at Altoona, in the county of Blair and State of Pennsylvania, has invented certain new and useful Improvements in Machine Tools, of which the following is a specification.

This invention relates to machine tools and has for its primary object an improved means for boring piston valve bushings when in position on steam locomotives.

Another object of this invention is to provide means for boring a plurality of valve bushings at one time with the same machine, thus saving much time and expense in building and repairing locomotives.

A further object of this invention is to provide adequate means for centering the boring tools in the bushing to be finished, such means embodying a self alining boring bar, which carries the cutting tools.

A still further object of the invention is to provide means for rotating the cutting bar and the feed screw which is carried by the bar.

With these and many other objects in view which will be more readily apparent as the nature of the invention is better understood, the same consists in the novel construction, combination and arrangement of parts as will be hereinafter fully pointed out illustrated and claimed.

It will be quite readily understood by those skilled in the art to which this invention belongs that the same is susceptible to considerable change and modification without departing from the spirit or scope of the invention, but a preferred and practical embodiment of the invention is shown in the accompanying drawings in which—

Figure 1 is a longitudinal section of a piston valve chamber having my invention applied thereto.

Figure 2 includes plan and end views of the cutter bar used in this invention, showing the recess in the bar adapted to receive the feed screw.

Figure 3 is a plan view together with an end view of the feed screw shown in position in Figure 1 of the drawings.

Figure 4 shows an edge and elevational view of the self aligning bearing used in conjunction with the boring bar shown in Figure 2 of the drawings.

Figure 5 shows the right and left hand threaded sleeves, together with an end view of each, that are used to advance the tool holder, when the sleeve is locked against rotation in the holder.

Figure 6 shows a side and an elevational view of the cutting tool holder, shown in position in Figure 1 of the drawings.

Figure 7 is a sectional view together with an elevational view of one portion of the concave bearing used to co-operate with the spherical journal shown in Figure 4 of the drawings.

Figure 8 shows the parts in detail that are used to hold the feed screw in operation position at the driving end of the cutter bar.

Figure 9 shows edge and elevational views of the feed screw clamp used to hold the end of the screw, opposite the driver end, in position in the cutter bar as shown in Figure 1 of the drawings.

Figure 10 shows elevation and edge views of cutter bar clamp used to prevent longitudinal shifting of the cutter bar.

Figure 11 shows front and edge views of the self aligning bearing holder positioned at either end of the piston valve chamber.

Similar reference numerals refer to similar parts throughout the several figures of the drawings.

In carrying out this invention I provide a rotatable cutter bar designated by the numeral 10, which is adapted to be rotated by a motor attached by any suitable means to the end 11 which protrudes from the bar attachments as shown in Figure 1 of the drawings. The bar 10 is provided with a longitudinal groove 12, in which is positioned a feed screw 13 on which is preferably cut a right hand and a left hand Acme thread.

The feed screw 13 is held in operative and rotative position by a clamp 14, which is adapted to fit into a recess 15 cut in the cutter bar 10 as shown in Figure 2 of the drawings. The clamp 14 consists primarily of a base portion 16 in which the feed screw rests, and a clamp portion 17 which fits over the feed screw and is held in place by a plurality of screws or similar means. The feed screw 13 is provided with a plurality of collars 18, each of which is adapted to fit into a corresponding recess in the base portion 16 of the clamp 14, while the clamp portion 17 is likewise cut to coact with the feed screw 13. The square collars on the feed screw form together with the clamp 14 an effective means of preventing endwise or longitudinal movement of the feed screw 13. The opposite end 19 of the feed screw is provided with a journal 20, which is adapted to rotate in a bearing 21 of the clamp 22 shown in Figure 9 of the drawings, the clamp 22 being held in position on the cutter bar by a plurality of screws 23 or similar means.

The cutting bar 10 is provided with a self aligning bearing 24 at each end as shown in Figure 1 of the drawings.

The bearing 24 consists essentially of a sleeve 25 adjacent the shaft 10, a spherical shell 26 into which the sleeve 25 is adapted to be forced. The spherical shell 26 coacts with a plurality of concave annular bearing blocks 27, each of which is positioned in the end spider castings 28 and 29 as shown in Figure 1 of the drawings.

The end casting 28 is provided with an annular threaded boss 30 which is engaged by a similar threaded cap 31 which is provided with an annular threaded neck 32, engaged by an end cap 33. The cap 31 is provided with a recess or cavity 34, in which is positioned a clamp 35 which is provided with means for drawing the same down on the shaft 10 with which the clamp rotates, sufficient clearance being allowed between the bottom of the recess and the face of the cap to permit of rotation.

The clamp 35 being drawn tight on the bar and being free to rotate within the cavity 34 forms an effective lock against endwise movement of the cutter bar 10.

The tool holder designated by the numeral 36 is provided with a central opening 37, which is engaged by the shaft 10 and the feed screw 13. The tool holder is provided with a recess 38 positioned in axial alignment with the opening 37. A threaded block 39 having a counter bore 40 into which a set screw 41 is adapted to fit, is positioned in the recess 38 and clamped down on the feed screw 13 which is adapted to be rotated by a train of gears not shown in the drawings.

It will be further noticed that one end of the feed screw has the thread cut right hand while the other end has the screw thread cut left hand and with both tools cutting at opposite ends of the valve bushings the end thrust on the shaft 10 is reduced to a minimum.

The clamp 35 is adapted to be fitted in a recess in the shaft 10 which will lock the same against longitudinal movement when heavy cuts are being taken with the cutting tools.

Having thus described my invention what I claim and desire to cover by Letters Patent is:—

1. A device for machining piston valve bushings including a pair of recessed end spiders having external threads at the mouth of the recessed portions, bearing blocks fitted in said recessed portions, a spherical shell fitted in said bearing blocks, a cutter bar journalled in said shells, end caps fitted to the externally threaded portions of the recessed end spiders, one of said end caps being provided with a chamber and a cover adapted to be locked therewith, and a clamp carried by the cutter bar and positioned in the end cap having the chamber to lock the bar against longitudinal movement.

2. A device for machining piston valve bushings including a pair of end spiders having recesses, means for attaching the arms of the end spiders to the valve casing, self-aligning bearings fitted into said recesses of the end spiders and each comprising a bearing block having a socket portion, a spherical bearing shell fitting in the socket portion of the block, a sleeve within the shell, a cutter bar fitted within the sleeve of each self-aligning bearing, and detachable end caps for holding the bearing blocks within the recesses of the end spiders.

In testimony whereof he affixes his signature.

HARRY A. BRENAMAN.